Dec. 29, 1931. C. H. THOMPSON 1,838,795
LIFT TRUCK SKID
Filed May 31, 1930 2 Sheets-Sheet 1

INVENTOR
C. H. THOMPSON
BY
ATTORNEYS

Dec. 29, 1931.   C. H. THOMPSON   1,838,795
LIFT TRUCK SKID
Filed May 31, 1930   2 Sheets-Sheet 2
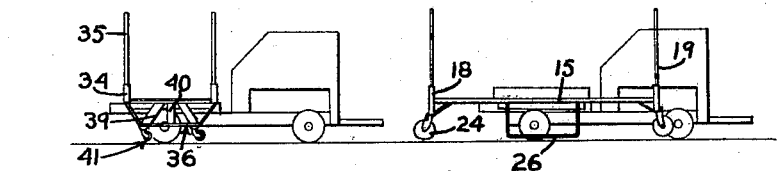
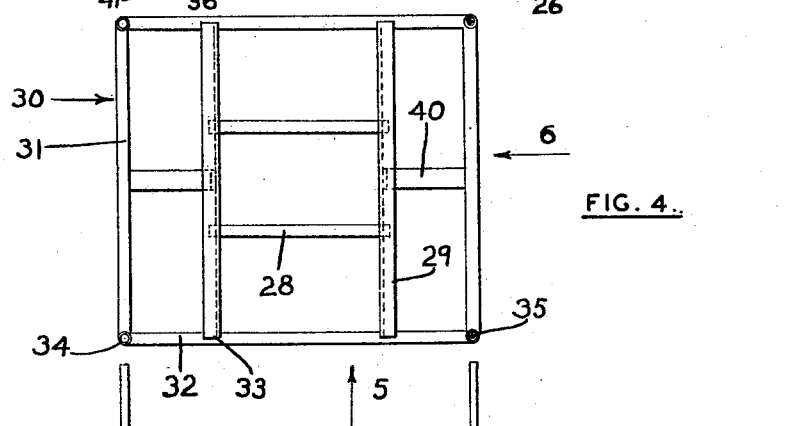
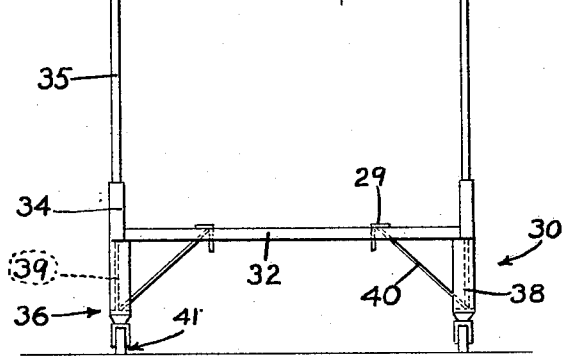
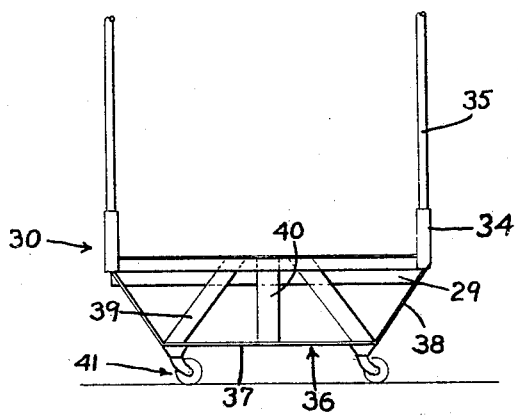
INVENTOR
C. H. THOMPSON
BY
ATTORNEYS Patented Dec. 29, 1931

1,838,795

UNITED STATES PATENT OFFICE

CLAIR H. THOMPSON, OF LOS ANGELES, CALIFORNIA

LIFT TRUCK SKID

Application filed May 31, 1930. Serial No. 457,772.

My invention has to do with skids suitable for carrying heavy loads and which may be raised on a lift truck and transported to the places desired, and then the skid may be lowered for the withdrawal of the truck.

An object of my invention is the construction of a skid which may be adapted for the purpose above defined; that is: to be lifted by a lift truck and then transported and deposited again, and in which the skid is designed to carry material which is very much longer than the lift truck and which it would be practically impossible to conveniently carry and transport on the platform of the lift truck itself, and, moreover, a further object of my invention is designing skids for carrying material whereby the lift truck may be employed for transporting a number of skids so that these skids may be loaded and unloaded without detaining the lift truck.

A further and more detailed object of my invention is a skid for handling, preferably, lengthy material, and in which the load being carried may be balanced on either side of the lift truck, and if the material is of considerable length, project beyond the two ends of the truck, or, if desired, the skid may have its load placed transversely and the load extend out beyond the sides of the truck and still be supported by the skid when the skid is again deposited on the ground.

In the construction of the skid for transporting long material, such as lumber, on opposite sides of the lift truck I employ transverse lifting beams which are spaced apart by spacing bars, these spacing bars being adapted to fit on opposite sides of the platform of the lifting truck and the transverse beams to rest on the platform and to extend laterally beyond the sides of the platform. On opposite ends of the beams there is a rectangular framework, and each frame, if desired may be provided at its corners with detachable posts, these posts fitting in sockets in the frame. In order to support the skid while it is being loaded and unloaded, I preferably provide casters at the outside corners of the rectangular frames and, in addition, provide shoes which are preferably positioned but slightly beyond the wheels of a lift truck when such truck is transporting the skid. The caster wheels are intended to contact with the ground should the load tend to tilt to one side or the other and support the side which is tilted down while being transported by the lift truck. The whole device is arranged so that a lift truck may be readily run underneath the central portion of the transverse lifting beams, the platform being then elevated so that the shoes and the casters are clear of the ground, and when so elevated, a heavy load of bulky material may be readily transported by one lift truck, and with my construction, if lumber is being transported, the lumber may be several times the length of the lift truck.

If smaller or unusually heavier material is to be transported, I may put on what may be termed a single skid. This has transverse beams which have spacing bars connected thereto to fit on opposite sides of the lift truck platform, and small, rectangular frames are connected to these transverse lifting beams. The outside corners of these frames are provided with sockets in which detachable posts may be inserted, and in this case the load of lengthy material, such as lumber, is designed to be carried transversely of the skid, and thus, transversely of the lift truck which transports the skid. In this form of single skid I also, preferably, provide casters on which the load may be shifted when the truck is withdrawn, or which casters will support a side of the load should it tilt in transportation.

My invention is illustrated in connection with the accompanying drawings in which:—

Fig. 4 is a plan of a single type of skid.

Fig. 5 is an end elevation of Fig. 4 taken in the direction of the arrow 5.

Fig. 6 is a side elevation of Fig. 4 taken in the direction of the arrow 6.

Fig. 7 is a diagrammatic side elevation of the single type of skid illustrating the manner of transportation.

Fig. 8 is a side elevation of the double type of skid showing the manner of transportation.

Figure 1:
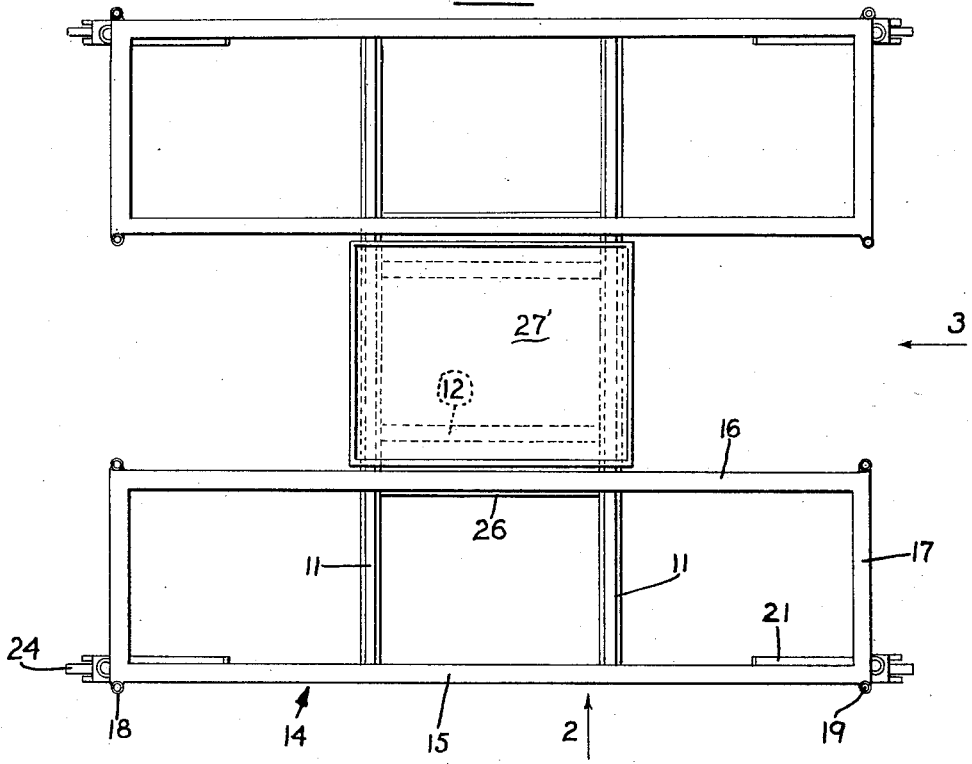
Fig. 1 is a plan of a double type of skid for carrying a load on opposite sides of the lift truck.
Figure 2:
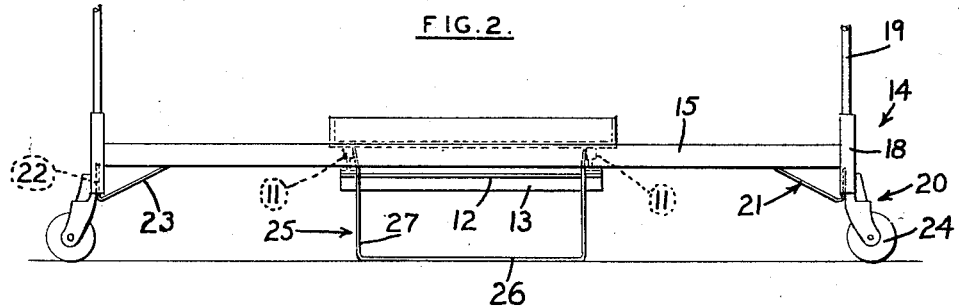
Fig. 2 is a side elevation taken in the direction of the arrow 2 of Fig. 1.
Figure 3:
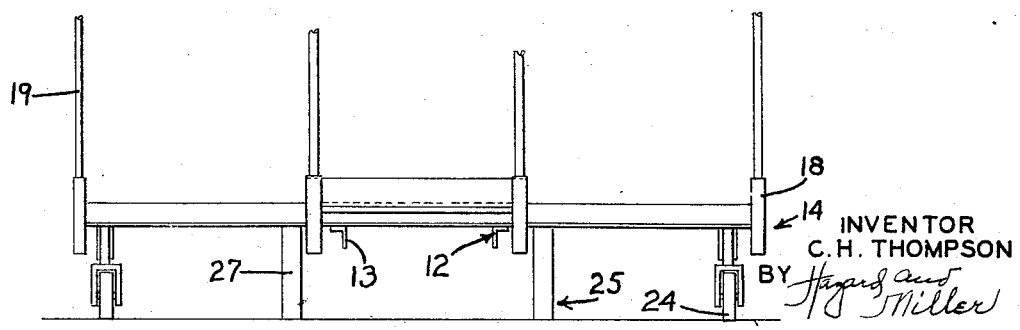
Fig. 3 is an end elevation taken in the direction of the arrow 3 of Fig. 1.

Referring first to the construction of Figs. 1, 2, and 3. This illustrates transverse lifting beams 11, which I find convenient to make of discarded railroad rails, and attached to the under side or flanges of these rails there are spacing bars 12. These are preferably angles and have a depending flange 13. There are two rectangular frames designated generally at 14 which rest on the transverse beams. These frames have an outer bar 15, an inner bar 16, and end bars 17 jointed at the corners and secured to the beams 11. For convenience, these bars are preferably formed of angle iron. At each of the corners of the frames there are sockets 18 which are preferably formed of tubes and welded or otherwise secured to the frames adjacent the corners. Movable posts 19 may be fitted in these sockets and such posts are preferably formed of pipes. This whole construction is rigidly connected together, and I find a simple manner is to weld the longitudinal bars of the frame to the transverse beams.

In order to support the skids I utilize casters 20 which are connected to strap-like braces 21, these braces having a vertical strap 22 and an oblique strap 23, the strap 22 being connected adjacent the outside corners of each of the frames and the diagonal braces attached to the outside bars. The caster wheels 24 are sufficiently large to carry a heavy load and to roll readily with such load, especially if the skid tilts on the lift truck. As additional support, there are a pair of shoes 25, these being preferably formed of flat straps and having a ground engaging section 26, and two vertical sections 27, the vertical sections being secured to the transverse beams and in alignment with the inner bars 16.

In the manner of use and operation of the construction of Figs. 1, 2, and 3, it will be obvious that the frames 14 are eminently adapted to carry long material such as lengths of lumber, pipes, rods, or rails, and in which these may be loaded resting on the end bars 17, and held in place by the socket tubes 18; and if the load is of considerable height the upper part of the load being maintained in position by the movable posts 19. The spacing bars 12 are located a sufficient distance apart so that they will fit on opposite sides of the platform of the lift truck, whereby this platform may engage the under side or flanges of the transverse lifting beams 11. The lift truck will be run between the two rectangular frames from either end. The platform of the lifting truck may then be raised sufficiently to elevate the caster wheels and the shoes above the ground, whence the load may then be transported by the lift truck and conveyed to the place desired. This construction is particularly adapted for transporting lumber in a lumber yard, as the load is carried longitudinally of the lift truck and on opposite sides so that the lift truck with the skid may readily be run through the roadways, and it is manifest that the load such as lumber, pipe, rods, etc., may project considerably beyond the end of the skid.

In loading the skid the load may be balanced, but when raised by the lift truck, if it should tilt to one side, the caster wheels will engage the ground and run on the ground, partly supporting one side of the load. Therefore, there is no danger of the load tipping off the platform of the lift truck. The skid carries a pan 27'.

In connection with the construction of Figs. 4, 5, and 6, which is the design for the single skid, I employ transverse beams 28, which, in this case, have spacing bars 29 directly connected to the ends of these transverse beams. In this case the spacing bars are preferably angles with a flange extending downwardly. A framework designated generally at 30 is positioned on each side of the structure made by the transverse beams and the spacing bars, and comprises an outer longitudinal bar 31 and end bars 32. The end bars extend completely across from one side to the other and are joined to the outer bar 31 at the corners, preferably being welded together, and these end bars are secured to ends 33 of the spacing bars. Sockets 34 formed of tubes are connected at the corners of the side bars 31 and end bars 32, and extension posts 35, formed of pipes, are detachably fitted in these sockets.

In this construction I employ a shoe designated generally at 36 which has a horizontal bottom section 37, diagonal end pieces 38 which extend to opposite ends of the side beams 31 at the corners, interior diagonal braces 39 which connect from the horizontal section to the side beam 31. There are also transverse diagonal braces 40 which connect from substantially the mid position of the horizontal section 37 to the center of the spacing bars 12. Casters 41 are secured, preferably, at opposite ends of the horizontal section 37 of the shoe. It will be understood that these casters may be omitted and the shoe made of a sufficient depth to retain the frame of the skid at a sufficient elevation to allow a lift truck to fit thereunder.

In the use of the invention of Figs. 4, 5, and 6, the lift truck is passed under the transverse beams 28 and the end bars 33, the spacing bars fitting on opposite sides of the platform of the truck. This type is designed to have the load transverse to the lift truck, and the load, therefore, rests on the side bars 31 and the spacing bars 29; and if the load embodies structures such as planks or other elongated articles, these may project to a considerable distance on either side of the truck. It will be apparent by this type of construction that the lift truck may convey the skid and the load to any desired place, and should the skid and its load tend to tilt, the casters on one side will engage the ground and prevent the load from upsetting. This arrangement of the single type of skid is quite suitable where a more or less heavy, concentrated load is to be carried.

When using the table type of skid it is frequently necessary to carry small iron parts, such as bolts and other connectors used in building construction, and also equipment of various kinds, which may be loaded on the pan 27' illustrated in connection with Figs. 1, 2, and 3.

Various changes may be made in the details of construction without departing from the spirit or scope of the invention as defined by the appended claims.

I claim:

1. A device as described comprising a plurality of transverse bars and a longitudinal spacing bar connecting the ends of the transverse bars, the transverse bars being adapted to bear on the platform of a lift truck, and the spacing bars to center the truck by engaging the sides thereof, an outer frame connected to the transverse bars at the end and the ends of the spacing bars and extending outwardly beyond said spacing bars, and having casters secured to the outside portion of the frame, said casters being adapted to engage the ground should said frames tilt when carried by a lift truck.

2. A device as described comprising a plurality of parallel transverse beams having a pair of spacing bars secured to said beams, the beams being adapted to bear on the platform of a lift truck and the spacing bars to center the truck by engaging the sides thereof, a pair of frames, each frame having an end bar in alignment with the end transverse beams and having an outer longitudinal bar, a pair of casters on each outer frame positioned substantially below the outer longitudinal bar and adapted to engage the ground should the outer frames tilt downwardly when being supported by a lift truck.

3. A device as described comprising a center skid adapted to be supported on the platform of a lift truck, a pair of rectangular frames extending outwardly at the sides beyond the center skid, each rectangular frame having casters on the outside portion thereof adapted to engage the ground.

4. A device as described comprising a rectangular center skid adapted to be supported on the platform of a lift truck, a rectangular side frame on each side of said center skid and secured thereto, said frames also extending beyond the ends of the center skid and being adapted for carrying loads on opposite sides of a lift truck.

5. A device as described comprising a center skid having spacing bars to center said skid on the platform of a lift truck and having rectangular side frames secured to the center skid and extending sidewise beyond such skid, said side frames having a longitudinal outer bar with casters at each end of such bar, and a shoe secured to each side frame substantially adjacent the sides of the center skid.

6. A device as described comprising a plurality of parallel, transverse beams having spacing bars connecting such beams, rectangular frames secured adjacent the ends of said beams, casters mounted on the outside portion of said frames, the said beams being adapted to bear upon the platform of a lift truck, and the truck to be centered by the spacing bars, and the said casters to engage the ground on the tilting of the beams and frames during transportation of a load, the rectangular frames having inner and outer bars extending beyond the beams, with end bars connecting the outer and inner bars and extending beyond the transverse beams adapted to carry a load on opposite sides of the lift truck.

7. A device as described comprising a plurality of transverse beams with parallel spacing bars connecting the beams, a pair of rectangular frames each having an outer longitudinal bar secured to the ends of the transverse beams, and an inner longitudinal bar supported on an inner portion of the transverse beams, with end bars at each end of each frame, the transverse beams being adapted to bear upon the platform of a lift truck and the spacing bars to center such platform, the outside corner of each of the frames having a caster attached thereto, and a shoe extending downwardly from the inside portion of each frame, the casters and the shoe being adapted to engage the ground, the said casters contacting with the ground should the transverse beams and frames tilt during transportation of the load.

8. A device as described comprising a plurality of parallel, transverse beams, parallel spacing bars connecting said beams, a frame on each end of the beams having an outer longitudinal bar connected to the ends of the beams, and an inner longitudinal bar spaced inwardly from such end, with cross bars at the ends, the said frames projecting on opposite sides of the transverse beams, the said beams being adapted to bear upon the platform of a lift truck with the spacing bars centering such platform, there being a socket structure at the corner of each rectangular frame adapted to receive detachable posts, the outside corners of each frame having a caster extending downwardly, with a brace connecting such caster to the frame, and a pair of shoes having a ground engaging section with a pair of vertical sections connecting the said transverse beams and the inner bar of each frame.

In testimony whereof I have signed my name to this specification.

CLAIR H. THOMPSON.